United States Patent
Hiraoka et al.

(10) Patent No.: US 11,490,142 B2
(45) Date of Patent: Nov. 1, 2022

(54) ONE-TO-MANY COMMUNICATION SYSTEM

(71) Applicant: Science Arts, Inc., Tokyo (JP)

(72) Inventors: Hidekazu Hiraoka, Tokyo (JP); Kazuaki Okimoto, Tokyo (JP); Katsumi Yokomichi, Tokyo (JP)

(73) Assignee: Science Arts, Inc., Tokyo (JP)

( * ) Notice: Subject to any disclaimer, the term of this patent is extended or adjusted under 35 U.S.C. 154(b) by 1 day.

(21) Appl. No.: 16/393,133

(22) Filed: Apr. 24, 2019

(65) Prior Publication Data
US 2019/0297361 A1 Sep. 26, 2019

(30) Foreign Application Priority Data

Feb. 27, 2018 (JP) .............................. JP2018-033486

(51) Int. Cl.
*G06F 15/16* (2006.01)
*H04N 21/2387* (2011.01)
(Continued)

(52) U.S. Cl.
CPC ....... *H04N 21/2387* (2013.01); *H04L 65/611* (2022.05); *H04N 21/2393* (2013.01); *H04N 21/6405* (2013.01); *H04W 4/10* (2013.01)

(58) Field of Classification Search
CPC .......... H04N 21/2387; H04N 21/2393; H04N 21/6405; H04L 65/4076; H04W 4/10
(Continued)

(56) References Cited

U.S. PATENT DOCUMENTS 5,862,142 A * 1/1999 Takiyasu ............... H04B 1/7156
370/480
7,343,162 B2 * 3/2008 Tandai .................... H04W 4/10
455/448
(Continued)

FOREIGN PATENT DOCUMENTS

JP H05-145916 A 6/1993
JP 2006-050500 A 2/2006
(Continued)

OTHER PUBLICATIONS

Japanese Office Action for JP Patent Application No. 2018-033486, dated May 15, 2018 (6 pages).

*Primary Examiner* — Bharat Barot
(74) *Attorney, Agent, or Firm* — Harness, Dickey & Pierce, P.L.C.

(57) ABSTRACT

According to one embodiment, a signal processing apparatus includes processing circuitry. The processing circuitry correlates a plurality of communication terminals as a group. The processing circuitry assigns a first transmission right to one of the communication terminals in the group and a second transmission right to one of the communication terminals in the group. The processing circuitry transmits, through a first channel, image data transmitted from the communication terminal which is assigned with the first transmission right to the other communication terminals in the group. The processing circuitry transmits, through a second channel, voice data transmitted from the communication terminal which is assigned with the second transmission right to the other communication terminals in the group. The processing circuitry is configured to permit a single communication terminal to be assigned with both the first and second transmission rights.

16 Claims, 10 Drawing Sheets

(51) Int. Cl.
*H04W 4/10* (2009.01)
*H04N 21/6405* (2011.01)
*H04N 21/239* (2011.01)
*H04L 65/611* (2022.01)

(58) Field of Classification Search
USPC ............... 709/202–203, 217–219, 227–228
See application file for complete search history.

(56) References Cited

U.S. PATENT DOCUMENTS

| | | | | |
|---|---|---|---|---|
| 7,683,925 | B2* | 3/2010 | Lee | H04W 4/10 348/14.01 |
| 8,855,697 | B2* | 10/2014 | Dostal | H04L 65/4061 455/518 |
| 9,137,277 | B2* | 9/2015 | Ohno | H04W 4/10 |
| 10,972,876 | B2* | 4/2021 | Balasubramanian | H04W 4/08 |
| 2001/0015972 | A1* | 8/2001 | Horiguchi | H04L 67/2823 370/352 |
| 2002/0044536 | A1* | 4/2002 | Izumi | H04W 72/0446 370/329 |
| 2006/0077996 | A1* | 4/2006 | Lee | H04W 4/10 370/441 |
| 2006/0225117 | A1 | 10/2006 | Ono et al. | |
| 2008/0220753 | A1 | 9/2008 | Matsuda | |
| 2010/0004013 | A1* | 1/2010 | Iwayama | H04W 4/10 455/518 |
| 2010/0131760 | A1* | 5/2010 | Fujita | H04N 21/63345 713/168 |
| 2016/0295016 | A1* | 10/2016 | Fletcher | H04M 3/5116 |

FOREIGN PATENT DOCUMENTS

| | | |
|---|---|---|
| JP | 2006-285619 A | 10/2006 |
| JP | 2007-049424 A | 2/2007 |
| JP | 2007-165951 A | 6/2007 |
| JP | 2008-219297 A | 9/2008 |
| JP | 2008-227592 A | 9/2008 |
| JP | 2009-147554 A | 7/2009 |
| JP | 2013-009434 A | 1/2013 |

* cited by examiner

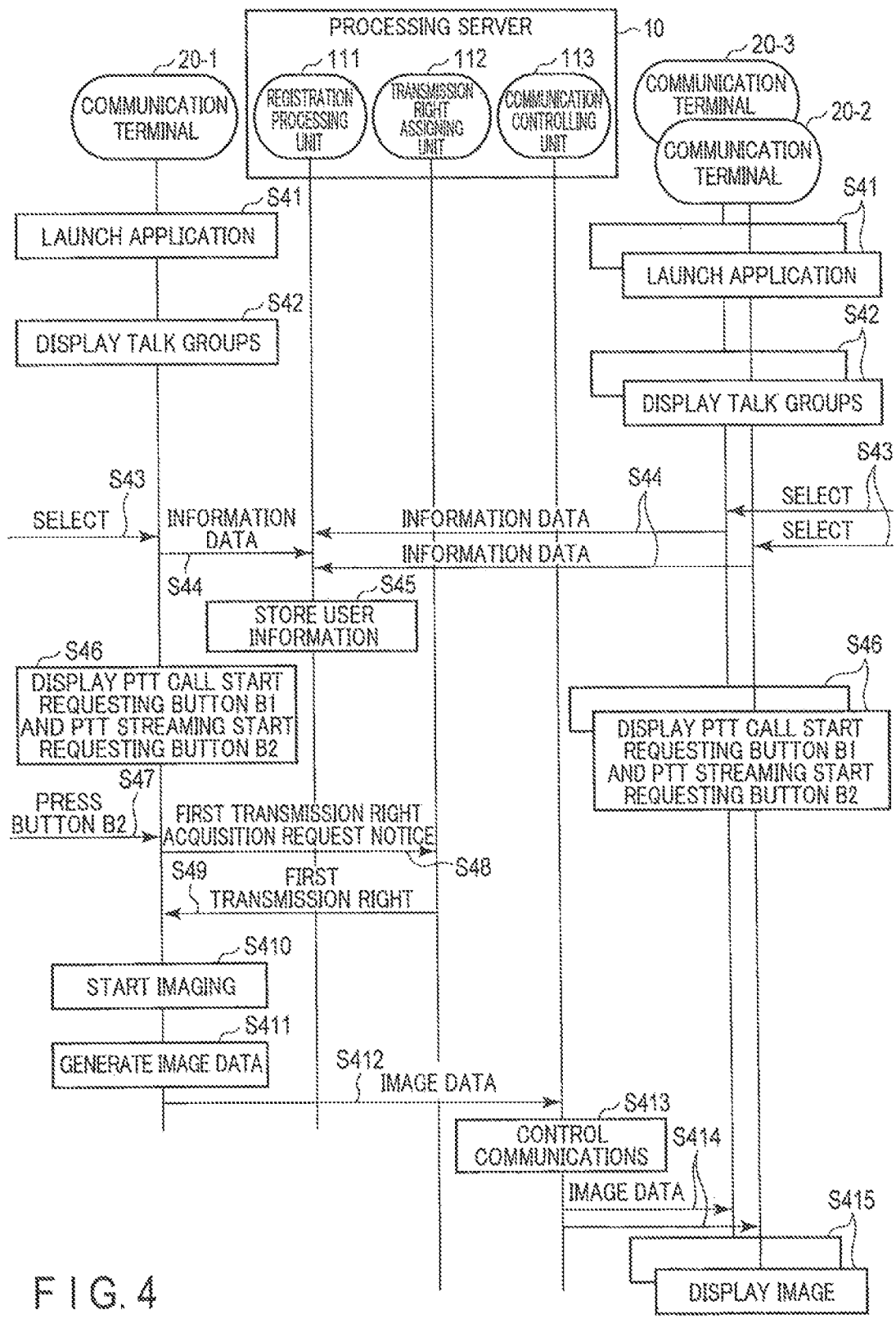
F I G. 4

| Talk Group ID | User ID |
|---|---|
| Group01 | User01 |
| | User02 |
| | User03 |
| | |
| Group02 | UserJ |
| | UserJ+1 |
| | |
| Group03 | UserK |
| | UserK+1 |
| | |

FIG. 5

| User01 | IP Address 01 | Location Information 01 |
|---|---|---|
| User02 | IP Address 02 | Location Information 02 |
| User03 | IP Address 03 | Location Information 03 |
| UserJ | IP Address J | Location Information J |
| UserJ+1 | IP Address J+1 | Location Information J+1 |
| UserK | IP Address K | Location Information K |
| UserK+1 | IP Address K+1 | Location Information K+1 |

FIG. 6

ONE-TO-MANY COMMUNICATION SYSTEM

CROSS-REFERENCE TO RELATED APPLICATIONS

This application is based upon and claims the benefit of priority from Japanese Patent Application No. 2018-33486, filed Feb. 27, 2018, the entire contents of which are incorporated herein by reference.

FIELD

Embodiments described herein relate generally to a signal processing apparatus, a communication system, a communication method, and a storage medium.

BACKGROUND

Push-to-Talk (PTT) communication, being a half-duplex voice communication system, is known as the technique realizing one-to-many simultaneous group voice communications. The PTT communication involves use of, for example, transceivers, wireless equipment, etc., as terminals. In the PTT communication, a user is permitted to send voices to other parties forming a group, during a period where the user is pressing a call button arranged on its terminal.

The recent spread of multipurpose communication terminals such as smartphones has attracted attention to Push-to-Talk over Cellular (PoC) that stipulates transmission of packets including voice data to multiple devices in a multicast manner. According to the PoC, a transmission right for transmitting voice data is given to one of multiple communication terminals forming a group. The communication terminal having acquired the transmission right transmits voice data to the other communication terminals in a multicast manner.

SUMMARY

According to a first embodiment, a signal processing apparatus includes processing circuitry. The processing circuitry correlates a plurality of communication terminals as a group. The processing circuitry assigns a first transmission right to one of the communication terminals in the group and a second transmission right to one of the communication terminals in the group. The first transmission right is a right to transmit image data. The second transmission right is a right to transmit voice data. The processing circuitry transmits, through a first channel, image data transmitted from said one of the communication terminals which is assigned with the first transmission right to remaining one or more of the communication terminals in the group. The processing circuitry transmits, through a second channel, voice data transmitted from said one of the communication terminals which is assigned with the second transmission right to remaining one or more of the communication terminals in the group. The processing circuitry is configured to permit a single one of the communication terminals to be assigned with both the first transmission right and the second transmission right.

According to a second embodiment, a signal processing apparatus includes processing circuitry. The processing circuitry correlates a plurality of communication terminals as a group. The processing circuitry assigns a first transmission right to one of the communication terminals in the group and a second transmission right to one of the communication terminals in the group. The first transmission right is a right to transmit image data. The second transmission right is a right to transmit voice data. The processing circuitry transmits, through a first channel, image data transmitted from said one of the communication terminals which is assigned with the first transmission right to remaining one or more of the communication terminals in the group. The processing circuitry transmits, through a second channel, voice data transmitted from said one of the communication terminals which is assigned with the second transmission right to remaining one or more of the communication terminals in the group. The processing circuitry stores the image data transmitted from said one of the communication terminals which is assigned with the first transmission right and the voice data transmitted from said one of the communication terminals which is assigned with the second transmission right. The processing circuitry generates, based on the stored image data and the stored voice data, related data indicative of the voice data transmitted during transmission of the image data.

BRIEF DESCRIPTION OF THE DRAWINGS

FIG. 4 is a diagram for explaining operations of the processing server and the communication terminals for performing data communications in the communication system of FIG. 1.

FIG. 5 is a diagram showing a management table stored in a storage appearing in FIG. 2.

FIG. 6 is a diagram showing a user management table stored in a memory in a processor appearing in FIG. 2.

DETAILED DESCRIPTION

Now, embodiments will be described with reference to the drawings.

Figure 1:
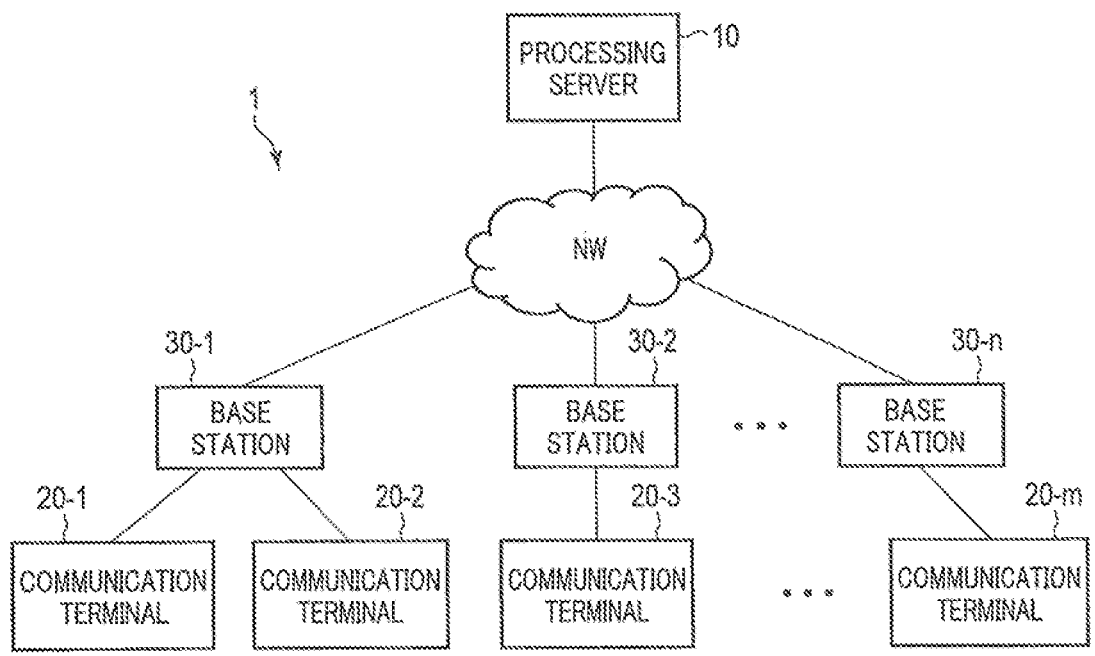
FIG. 1 is a block diagram showing a functional configuration for a communication system according to a certain embodiment.

FIG. 1 is a block diagram showing an example of the functional configuration for a communication system 1 according to a certain embodiment. The communication system 1 of FIG. 1 utilizes, for example, Push-to-Talk over Cellular (PoC) to realize one-to-many data communications in units of groups. For example, the communication system 1 includes, as shown in FIG. 1, a processing server 10, communication terminals 20-1 to 20-m, and base stations 30-1 to 30-n.

The processing server 10 is connected to the base stations 30-1 to 30-n via a network such as the Internet, a communication network furnished by a communication carrier, and so on. The communication terminals 20-1 to 20-m are each adapted for wireless connection to any of the base stations 30-1 to 30-n that forms a wireless area covering the terminal's current location.

The processing server 10 may be, for example, a signal processing apparatus adapted to implement control for transmitting, in a multicast manner, voice data and image data from one or more of the communication terminals 20-1 to 20-m, having the transmission rights for respective data, to other one or more of the communication terminals 20-1 to 20-m for users participating in the same talk group as the user of the originating terminal. The embodiments will assume each transmission right to mean a right by which data transmissions in the context of PoC are permitted.

Figure 2:
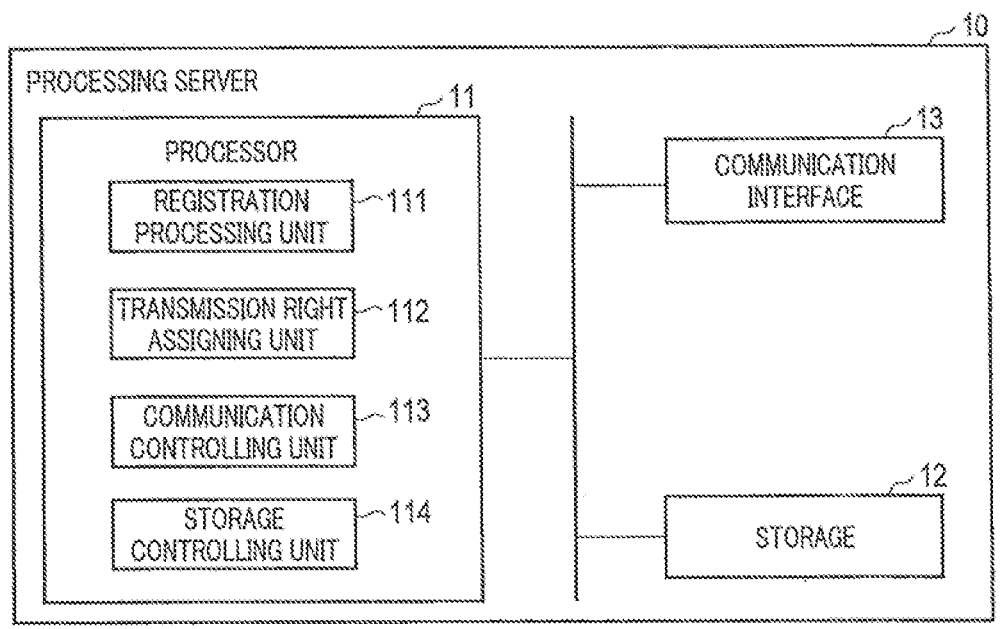
FIG. 2 is a block diagram showing a functional configuration for a processing server appearing in FIG. 1.

FIG. 2 is a block diagram showing an example of the functional configuration for the processing server 10 appearing in FIG. 1. As shown in FIG. 2, the processing server 10 includes, for example, a processor 11, a storage 12, and a communication interface 13. The processor 11, the storage 12, and the communication interface 13 are connected together via, for example, a bus so that they can communicate with each other.

The processor 11 may be, for example, processing circuitry including components such as a central processing unit (CPU) and a memory for use in the CPU's processing. The memory here is a so-called main storage device, and may be constituted by a dynamic random access memory (DRAM), etc.

In an exemplary operation, the CPU loads application programs stored in the storage 12 into the memory. The CPU runs the application programs loaded into the memory. The processor 11 thus realizes various functions corresponding to the application programs.

The storage 12 is a so-called auxiliary storage device, and may include a hard disk drive (HDD), nonvolatile storage circuitry, e.g., a solid state drive (SSD), etc., for storing various types of information. Note that the storage 12 may also be a drive device, etc., adapted to read and write various information sets from and to portable storage media such as a CD-ROM, a DVD, and a flash memory. The storage 12 stores application programs related to the embodiments.

The storage 12 is adapted to store user information for users participating in talk groups, under the control of the processor 11. The storage 12 is also adapted to store voice data transmitted from a communication terminal having the transmission right for voice data, under the control of the processor 11. The storage 12 is further adapted to store image data transmitted from a communication terminal having the transmission right for image data, under the control of the processor 11.

The communication interface 13 is circuitry for connection to the network. The communication interface 13 is adapted to transmit, via the network, data to at least one of the communication terminals 20-1 to 20-m each wirelessly connected to corresponding station of the base stations 30-1 to 30-n. The communication interface 13 is also adapted to receive, via the network, data transmitted from at least one of the communication terminals 20-1 to 20-m each wirelessly connected to corresponding station of the base stations 30-1 to 30-n.

The communication interface 13 may also establish connections to one or more external personal computers via a network such as the Internet. In such instances, for example, the processor 11 of the processing server 10 launches a web browser and accepts operational inputs from personal computers via the communication interface 13. The processor 11 also transmits signals to the personal computers via the communication interface 13.

The processor 11 shown in FIG. 2 runs the application programs stored in the storage 12 to realize functions corresponding to these programs. For example, by running the application programs, the processor 11 realizes functions to serve as a registration processing unit 111, a transmission right assigning unit 112, a communication controlling unit 113, and a storage controlling unit 114.

Note that the processor 11 may be constituted by a combination of multiple CPUs. That is, the registration processing unit 111, the transmission right assigning unit 112, the communication controlling unit 113, and the storage controlling unit 114 shown in FIG. 2 may be realized by the respective CPUs running the corresponding application programs.

The processor 11 may also be constituted by special hardware components having the respective functions of the registration processing unit 111, the transmission right assigning unit 112, the communication controlling unit 113, and the storage controlling unit 114. Moreover, the processor 11 may be constituted by an application specific integrated circuit (ASIC), a field programmable gate array (FPGA), other complex programmable logic device (CPLD), or a simple programmable logic device (SPLD), which incorporates dedicated hardware circuits having the respective functions of the registration processing unit 111, the transmission right assigning unit 112, the communication controlling unit 113, and the storage controlling unit 114.

The registration processing unit 111 is adapted to register users participating in talk groups for conducting one-to-many data communications. More specifically, and for example, the registration processing unit 111 acquires user information, i.e., information about users participating in a given talk group, based on information transmitted from the communication terminals 20-1 to 20-m. The registration processing unit 111 stores the acquired user information in the storage 12 as well as in the memory, in association with the talk group intended for participation.

The user information may include, for example, an ID of a talk group, an ID of a user participating in the talk group, an IP address of the user's communication terminal, a login state of the user, location information of the user's communication terminal, and so on. The registration processing unit 111 stores, in the storage 12, definition information indicative of which user participates in which talk group, that is, the ID of a talk group and the IDs of users participating in the talk group, for example. Also, the registration processing unit 111 stores, in the memory, information which dynamically changes according to the corresponding communication terminals 20 and their states, that is, the IP addresses, the login states, and the location information, etc., for example.

The transmission right assigning unit 112 is adapted to assign a transmission right for voice data and a transmission right for image data, independently and respectively to one of the communication terminals for users participating in a given talk group.

The communication controlling unit 113 is adapted to control communications among the communication terminals for users participating in talk groups, so that one-to-many data communications are implemented. For example, the communication controlling unit 113 in particular controls communications so that voice data and image data are transmitted through different communication channels. More specifically, in an exemplary instance, the communication controlling unit 113 transmits voice data transmitted from a communication terminal assigned with the transmission right, to the communication terminals held by users participating in the same talk group. The communication controlling unit 113 also transmits image data transmitted from the communication terminal assigned with the transmission right, to the communication terminals held by the users participating in the same talk group. In this instance, the protocol used for the voice data communication and the protocol used for the image data communication may be the same as or different from each other.

Furthermore, the communication controlling unit 113 is adapted to control communications so that image data and voice data are transmitted to one or more communication terminals requesting a video replay. More specifically, and for example, in response to a request for a video replay from users participating in a talk group, the communication controlling unit 113 transmits image data and voice data stored in the storage 12 to the communication terminals of the requestors.

The storage controlling unit 114 is adapted to control processing for storing received voice data and image data. More specifically, and for example, the storage controlling unit 114 retains, in the memory, voice data transmitted from a communication terminal with the transmission right. The storage controlling unit 114 stores the voice data retained by the memory, in the storage 12.

Also, for example, the storage controlling unit 114 retains, in the memory, image data transmitted from the communication terminal with the transmission right. The storage controlling unit 114 stores the image data retained by the memory, in the storage 12. The storage controlling unit 114 here stores the image data and the voice data in association with each other. More specifically, the storage controlling unit 114 may associate the image data with the voice data using, for example, time stamps for each talk group.

Furthermore, the storage controlling unit 114 may be adapted to read the voice data and the image data stored in the storage 12 upon request, and transmit them to the requestors.

Note that the processing server 10 may include an input interface. The input interface may be realized by, for example, a mouse, a keyboard, a touch pad which receives input instructions through contact of its operation screen, and so on. The input interface may convert input instructions from operators into electric signals, and output the electric signals to the processor 11. The input interface is not limited to physical operation devices such as a mouse, a keyboard, etc. Examples of the input interface may include a receive port adapted to accept electric signals from external input devices.

The processing server 10 may also include an output interface. The output interface may be realized by, for example, a display device, a print device, and the like. As the display device, any display equipment may be employed, including a CRT display, a liquid crystal display, an organic EL display, an LED display, a plasma display, etc. The display device is adapted to present images, etc., based on the image data. The print device is, for example, a printer. The print device is adapted to print out given information about communications in the form of a predetermined sheet. The output interface is not limited to physical output devices such as a display device, a print device, etc. Examples of the output interface may include an output port adapted to send out image data to an external output devices.

Referring to FIG. 1, the base stations 30-1 to 30-n are provided for respective areas of a predetermined size, and each adapted to form a predetermined wireless area. The base stations 30-1 to 30-n are each adapted to be wirelessly connected to one or more of the communication terminals 20-1 to 20-m, which are located within the wireless area formed by itself.

The communication terminals 20-1 to 20-m may be terminals held by respective users, and each may be, for example, a cellular phone, a smartphone, a tablet PC, a given special terminal device, or the like. The communication terminals 20-1 to 20-m are adapted to conduct one-to-many data communications under the PoC via the processing server 10.

In an exemplary instance, the communication terminals 20-1 to 20-m each participate in a group talk according to a user operation. One of the communication terminals 20-1 to 20-m acquires the transmission right for voice data, following a user operation. The communication terminal having acquired the transmission right for voice data accepts voice inputs from its user, and transmits the voice data based on the accepted voices to other communication terminals participating in the same group talk via the processing server 10.

Also, one of the communication terminals 20-1 to 20-m acquires the transmission right for image data, following a user operation. Then, for example, the communication terminal having acquired the transmission right for image data takes an image of a real space by a built-in imager, e.g., a camera. The communication terminal transmits the image data obtained by the imaging to other communication terminals participating in the same group talk via the processing server 10.

The communication terminals 20-1 to 20-m are also each adapted to receive the voice data and the image data transmitted from the processing server 10. The communication terminals 20-1 to 20-m each reproduce the voices based on the received voice data, and display the images based on the received image data on the own display.

Figure 3:
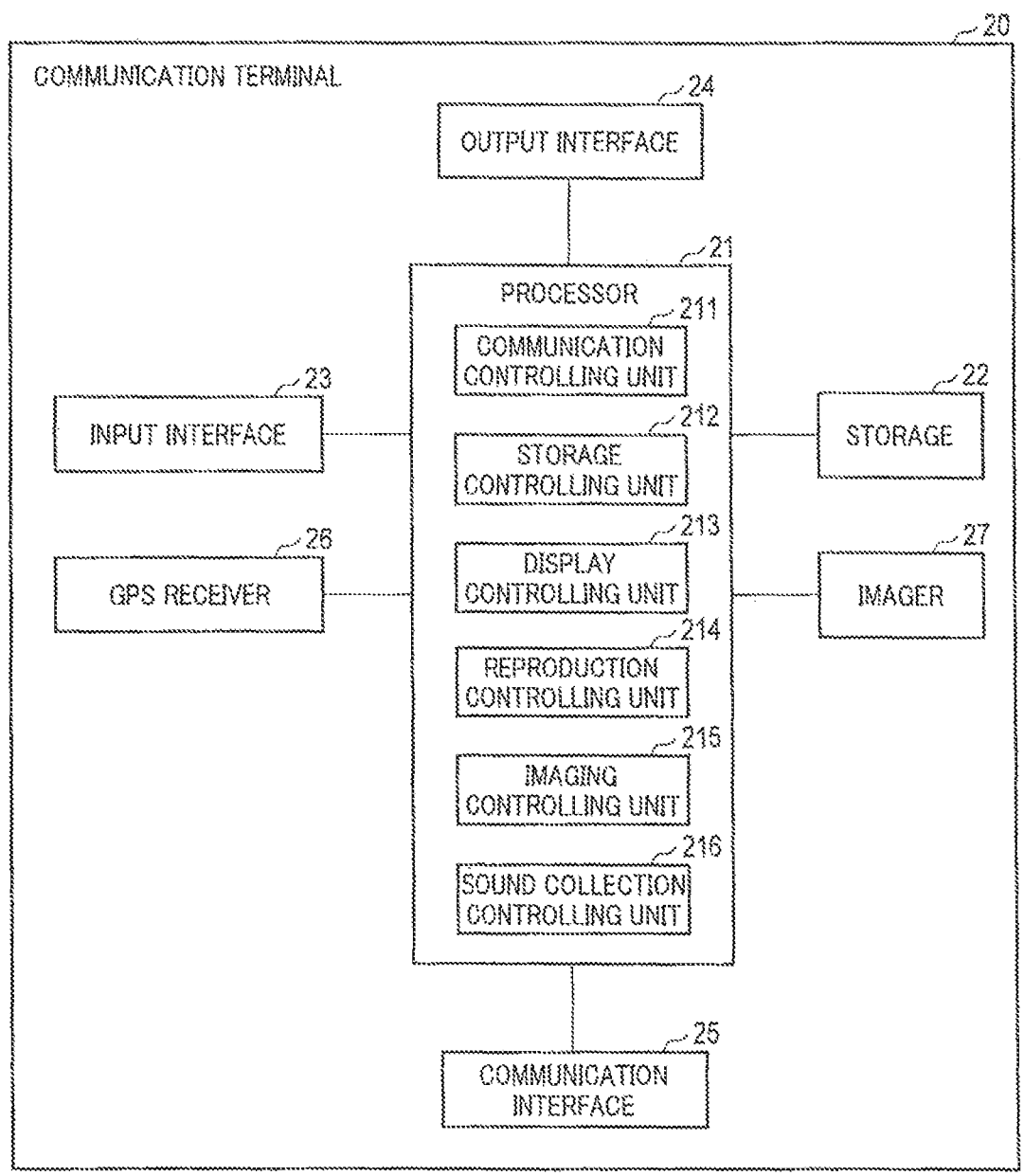
FIG. 3 is a block diagram showing a functional configuration for each communication terminal appearing in FIG. 1.

FIG. 3 is a block diagram showing an example of the functional configuration for each of the communication terminals 20 appearing in FIG. 1. The communication terminal 20 of FIG. 3 includes, for example, a processor 21, a storage 22, an input interface 23, an output interface 24, a communication interface 25, a GPS receiver 26, and an imager 27. Note that the communication terminals 20-1 to 20-m share similar configurations, so they may each be construed as the communication terminal 20 in the description with reference to FIG. 3.

The processor 21 may be, for example, processing circuitry including components such as a CPU and a volatile memory, e.g., a random access memory (RAM), as a main storage device for use in the CPU's processing. In an exemplary operation, the CPU loads application programs stored in the storage 22 into the RAM. The CPU runs the application programs loaded into the RAM. The processor 21 thus realizes various functions corresponding to the application programs.

The storage 22 is a so-called auxiliary storage device, and may include nonvolatile storage circuitry, e.g., a NAND or NOR flash memory, etc. Note that the storage 22 may also be a drive device, etc., adapted to read and write various information sets from and to portable storage media such as an SD card, a micro SD card, and so on. The storage 22 stores application programs related to the embodiments. The storage 22 also stores information for the group talks available for its terminal to participate in.

The imager 27 is a device for taking images of real spaces, and may be realized by, for example, a camera or the like. The imager 27 includes, for example, lens and an imaging sensor, and is adapted to generate image data by imaging real spaces.

The input interface 23 may be realized by buttons, a touch panel which receives input instructions through contact of its operation screen, a microphone for voice inputs, and so on. The input interface 23 is adapted to convert input instructions from an operator into electric signals, and output the electric signals to the processor 21.

The output interface 24 may be realized by, for example, a display device, a speaker, and so on. Examples of the display device include a liquid crystal display, an organic EL display, etc. The display device is adapted to present images, etc., based on the image data received through the data communications. The speaker is adapted to reproduce voices based on the voice data received through the data communications.

The communication interface 25 is circuitry for wireless communications with the base stations 30-1 to 30-n. The communication interface 25 may be realized by, for example, an antenna and a wireless equipment component. The antenna is adapted to received incoming radio signals. Also, the antenna is adapted to transmit radio signals output from the wireless equipment component. The wireless equipment component is adapted to convert the radio signals received by the antenna with a preset demodulation scheme, and output the data after the conversion to the processor 21. The wireless equipment component is also adapted to convert the data generated at the processor 21 into radio signals with a preset modulation scheme, and output the radio signals after the conversion to the antenna.

The GPS receiver 26 is adapted to receive signals from GPS satellites, and generate location information based on the received signals.

The processor 21 shown in FIG. 3 runs the application programs stored in the storage 22 to realize functions corresponding to these programs. For example, by running the application programs, the processor 21 realizes functions to serve as a communication controlling unit 211, a storage controlling unit 212, a display controlling unit 213, a reproduction controlling unit 214, an imaging controlling unit 215, and a sound collection controlling unit 216.

The communication controlling unit 211 is adapted to control the communications with the processing server 10. More specifically, and for example, the communication controlling unit 211 of the communication terminal 20, possessing the transmission right for voice data, converts a voice input from the microphone by following a TCP/IP-based unique protocol. The communication controlling unit 211 transmits the voice data after the conversion to the processing server 10 via the network and the corresponding base station 30.

Also, for example, the communication controlling unit 211 of the communication terminal 20, possessing the transmission right for image data, converts image data generated by the imager 27 in compliance with a predetermined communication protocol, e.g., real time messaging protocol (RTMP). The communication controlling unit 211 transmits the image data after the conversion to the processing server 10 via the network and the corresponding base station 30. Note that the communication controlling unit 211 may covert the image data generated by the imager 27, in compliance with the TCP/IP-based unique protocol instead.

For the communication terminals 20 without the transmission right, for example, the communication controlling unit 211 of each of these terminals receives the voice data and the image data transmitted from the processing server 10.

The storage controlling unit 212 is adapted to control processing for storing various notifications received. More specifically, and for example, the storage controlling unit 212 causes, upon receipt of a notification which may be of various contents, the volatile memory (e.g., RAM) to store the notification. The various notifications stored in the volatile memory may be deleted from the volatile memory when the execution of the application program for performing one-to-many voice communications has come to an end, when the communication terminal 20 is powered off, or on any suitable conditions. This can obviate the risk of information leakage, etc.

The display controlling unit 213 is adapted to control processing for display operations with the display as the output interface 24. More specifically, and for example, the display controlling unit 213 controls the display so that the display presents images based on the received various notifications and the received image data.

The reproduction controlling unit 214 is adapted to control processing for replay operations with the speaker as the output interface 24. More specifically, and for example, the reproduction controlling unit 214 controls the speaker so that the speaker reproduces voices based on the received voice data.

The imaging controlling unit 215 is adapted to control processing for imaging operations with the imager 27. More specifically, and for example, the imaging controlling unit 215 causes, upon acquisition of the transmission right for image data, the imager 27 to start an imaging operation.

The sound collection controlling unit 216 is adapted to control processing for sound collection operations with the microphone. More specifically, and for example, the sound collection controlling unit 216 drives the microphone upon acquisition of the transmission right for voice data.

Next, description will be given of how the processing server 10 and the communication terminals 20-1 to 20-m, configured as above and constituting the communication system 1, would operate. Note that the description will assume an instance where the communication terminals 20-1 to 20-3 will participate in a talk group G1 for data communications.

(PoC Communications)

FIG. 4 is a diagram for explaining exemplary operations of the processing server 10 and the communication terminals 20-1 to 20-3 for performing data communications in the communication system 1 of FIG. 1. The explanation based on FIG. 4 assumes that, in each of the communication terminals 20-1 to 20-3, the storage 22 already stores the information for the talk group G1. That is, the communication terminals 20-1 to 20-3 are in the state ready to participate in the talk group G1.

First, the users of the respective communication terminals 20-1 to 20-3 operate the communication terminals 20-1 to 20-3 to each launch the application program for conducting one-to-many voice communications utilizing the PoC (step S41). In each of the communication terminals 20-1 to 20-3, the display controlling unit 213 causes the display as the output interface 24 to present a display indicative of, for example, the talk group G1 as a selectable talk group (step S42). The display here may show more than one talk groups open for participation.

The users of the communication terminals 20-1 to 20-3 select the talk group G1 shown on their own displays (step S43). The processor 21 of each of the communication terminals 20-1 to 20-3 may automatically select the talk group G1 for participation, according to the frequency of participation, user setting, etc. Upon selection of the talk group G1, the processor 21 of each of the communication terminals 20-1 to 20-3 causes the own GPS receiver 26 to generate location information as of the talk group selection.

Upon selection of the talk group, the communication controlling unit 211 of each of the communication terminals 20-1 to 20-3 generates information data containing an ID of the selected talk group (hereinafter, "talk group ID"), an ID set for the own terminal (hereinafter, "user ID"), the obtained location information, etc. The information data has, for example, a packet structure. The communication terminals 20-1 and 20-2 transmit the generated information data to the processing server 10 via the base station 30-1 and the network NW (step S44). Meanwhile, the communication terminal 20-3 transmits the generated information data to the processing server 10 via the base station 30-2 and the network NW (step S44). Note that the timing to transmit the location information to the processing server 10 is not limited to the timing at which the selection of the talk group has been done. The communication terminals 20-1 to 20-3 may, according to the setting, obtain the location information and transmit the obtained location information to the processing server 10 in a preset cycle, for example, every 5 to 60 seconds.

The registration processing unit 111 of the processing server 10 stores, based on the information data transmitted from the communication terminals 20-1 to 20-3, information about the users as the talk group participants in the storage 12 as well as in the memory in the processor 11, in association with the talk group intended for participation (step S45). More specifically, and for example, the registration processing unit 111 referring to the received information data updates a management table which is stored in the storage 12 and used for managing users participating in talk groups.

FIG. 5 is a diagram showing an example of the management table stored in the storage 12 in FIG. 2. With the management table shown in FIG. 5, three talk groups are managed. As seen from this example, the stored information indicates that the users of the communication terminals 20-1 to 20-3 identified by the user IDs "User01" to "User03" are participating in the talk group G1 identified by the talk group ID "Group01".

The registration processing unit 111 also stores, based on the information data transmitted from the communication terminals 20-1 to 20-3, the information about the users as the talk group participants in the memory in the processor 11. More specifically, and for example, the registration processing unit 111 referring to the received information data updates a user management table which is stored in the memory and used for managing dynamically-changing user information.

FIG. 6 is a diagram showing an example of the user management table stored in the memory in the processor 11 in FIG. 2. The user management table shown in FIG. 6 manages information about users participating in talk groups. As seen from this example, the "User01" is associated with the "IP Address 01" and the "Location Information 01" of the communication terminal 20-1. Also, the "User02" is associated with the "IP Address 02" and the "Location Information 02" of the communication terminal 20-2. Further, the "User03" is associated with the "IP Address 03" and the "Location Information 03" of the communication terminal 20-3.

It is not a requisite for the processing server 10 to acquire the location information of the communication terminals 20-1 to 20-3. Accordingly, it is not a requisite for the communication terminals 20-1 to 20-3 to generate their location information. The information data transmitted from the communication terminals 20-1 to 20-3 to the processing server 10 may omit inclusion of the location information.

Figure 7:
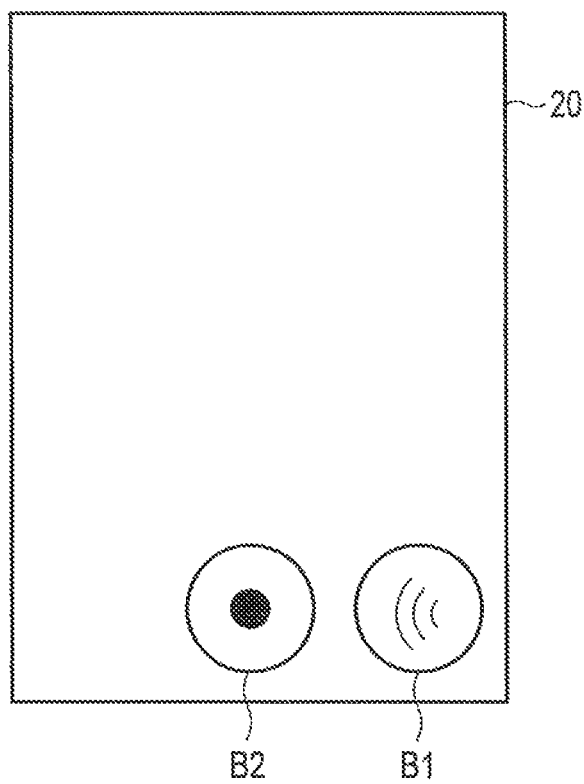
FIG. 7 is a schematic diagram showing what may be displayed on a display of the communication terminal of FIG. 3.

Upon selection of the talk group, the display controlling unit 213 of each of the communication terminals 20-1 to 20-3 causes the display to display a PTT call start requesting button B1 and a PTT streaming start requesting button B2 (step S46). FIG. 7 is a schematic diagram showing an example of the display that may be presented on the display of each of the communication terminals 20-1 to 20-3 shown in FIG. 4. In the example shown in FIG. 7, the PTT call start requesting button B1 appears at the lower right of the display, and the PTT streaming start requesting button B2 appears at the lower center of the display. In FIG. 7, the PTT call start requesting button B1 is given a mark indicative of a call, and the PTT streaming start requesting button B2 is given a mark indicative of an imaging operation, so that they can be discriminated from each other.

Note that the display layout for the PTT call start requesting button B1 and the PTT streaming start requesting button B2 is not limited to what is shown in FIG. 7. Where to arrange these buttons may be freely determined as long as such a layout allows for user's easy tap operations. Also, the PTT call start requesting button B1 and the PTT streaming start requesting button B2 are not limited to elements displayed on the display. For example, the buttons B1 and B2 may be physical buttons furnished on an operational device adapted for connection with the communication terminals, e.g., the communication terminal 20-1, via the respective input interface 23 as a connector.

In the context of this exemplary instance, the user of the communication terminal 20-1 presses the PTT streaming start requesting button B2 displayed on the own display of the communication terminal 20-1 (step S47). Upon the user's pressing the button B2, the communication controlling unit 211 of the communication terminal 20-1 transmits a first transmission right acquisition request notice as a request for the transmission right for image data, together with, for example, the talk group ID and the user ID to the processing server 10 via the base station 30-1 and the network NW (step S48).

The transmission right assigning unit 112 of the processing server 10, upon receipt of the first transmission right acquisition request notice from the communication terminal 20-1, checks if none of the communication terminals in the same talk group are assigned with the first transmission right. Upon confirming that there is no communication terminal with the first transmission right in the same talk group, the transmission right assigning unit 112 assigns the first transmission right, i.e., the right to transmit data through a first channel, to the communication terminal 20-1 (step S49). At this time, the transmission right assigning unit 112 registers, for example, the talk group ID "Group01" of the talk group G1 to which the communication terminal 20-1 assigned with the first transmission right belongs, the user ID "User01" of the user of the communication terminal 20-1, and the channel ID "Channel01" of the first channel permitted for use under the first transmission right.

Upon acquisition of the first transmission right, the imaging controlling unit 215 of the communication terminal 20-1 causes the imager 27 to start imaging a real space (step S410). The communication controlling unit 211 of the communication terminal 20-1 encodes the image data generated by the imager 27 into a format that conforms to a predetermined communication protocol, e.g., RTMP (step S411).

The image data having undergone the encoding step S411 includes, for example, a header area and an area for storing main data. The header area includes, for example, an area for storing a channel ID, an area for storing a sender ID, an area for storing a time stamp, and an area for storing a data length. The communication controlling unit 211 of the communication terminal 20-1 stores the "Channel01" in the area for storing a channel ID, the "User01" in the area for storing a sender ID, the imaging start time in the area for storing a time stamp, digital data of as much as predetermined frames of images in the area for storing main data, and the data length of the digital data of images in the area for storing a data length. The imaging start time indicates the time at which the imager 27 started imaging. More concretely, the communication controlling unit 211 sets, for example, the time at which the user pressed the button B2, as the imaging start time.

Note that the image data having undergone the conversion in step S411 does not contain voice data. For example, in order to prevent the image data from containing voice data, the processor 21 may deactivate the microphone while the imager 27 is caused to generate the image data in step S410. Or, for example, the processor 21 may exclude voice data from the encoding subject in step S411, instead of deactivating the microphone while the imager 27 is caused to generate the image data in step S410.

The communication terminal 20-1 transmits the generated image data to the processing server 10 via the base station 30-1 and the network NW, using the first channel (step S412).

Upon receipt of the image data from the communication terminal 20-1 with the first transmission right, the communication controlling unit 113 of the processing server 10 performs control for transferring the image data to the communication terminals 20-2 and 20-3 participating in the talk group G1 (step S413). More specifically, and for example, upon receipt of the image data from the communication terminal 20-1, the communication controlling unit 113 checks the sender ID "User01" stored in the image data against the user ID "User01" of the user in possession of the first transmission right, and determines whether or not they agree with each other. The communication controlling unit 113 checks the channel ID "Channel01" stored in the image data against the channel ID "Channel01" of the channel permitted under the first transmission right, and recognizes the talk group G1 to which the communication terminal 20-1 belongs. The communication controlling unit 113 generates duplicates of the image data as many as the number of the users participating in the talk group G1. The communication controlling unit 113 transmits the duplicates of the image data to the respective communication terminals 20-2 and 20-3 by referring to their IP addresses (step S414).

Upon receipt of the image data from the processing server 10, the communication controlling unit 211 of each of the communication terminals 20-2 and 20-3 decodes the received image data. In each of the communication terminals 20-2 and 20-3, the display controlling unit 213 causes the display to display the image data having undergone the decoding process (step S415).

The first transmission right is kept by the communication terminal 20-1 until it is released. As such, the communication terminal 20-1 can transmit the image data until the first transmission right is released. The release of the first transmission right may be realized by, for example, the user of the communication terminal 20-1, currently with the first transmission right, pressing the PTT streaming start requesting button B2 again. As an exemplary configuration, when, in step S47, the user presses the button B2 showing a symbol (e.g., circle) indicative of a ready-to-image state, the symbol turns into a look (e.g., square) indicative of an imaging operation in progress. Then, for example, when the user no longer finds the necessity of imaging, the user presses again the button B2 showing the square symbol. In response to this, the communication terminal 20-1 transmits a first transmission right release request notice to the processing server 10. The transmission right assigning unit 112 of the processing server 10, upon receipt of the first transmission right release request notice, releases the first transmission right from the communication terminal 20-1. Note that the actions for acquiring and releasing the first transmission right are not limited to pressing and re-pressing the button B2.

When the pressed-state PTT streaming start requesting button B2 is pressed again by the user of the communication terminal 20-1, the imaging controlling unit 215 of the communication terminal 20-1 causes the imager 27 to stop imaging. Upon stop of the imaging operation, the communication controlling unit 211 of the communication terminal 20-1 encodes the image data generated by the imager 27 into a format that conforms to the predetermined communication protocol. At this time, the time stamp area in the image data after the encoding process stores, for example, the imaging start time and the imaging end time. The imaging end time is, for example, the time at which the PTT streaming start requesting button B2 is pressed again.

Figure 8:
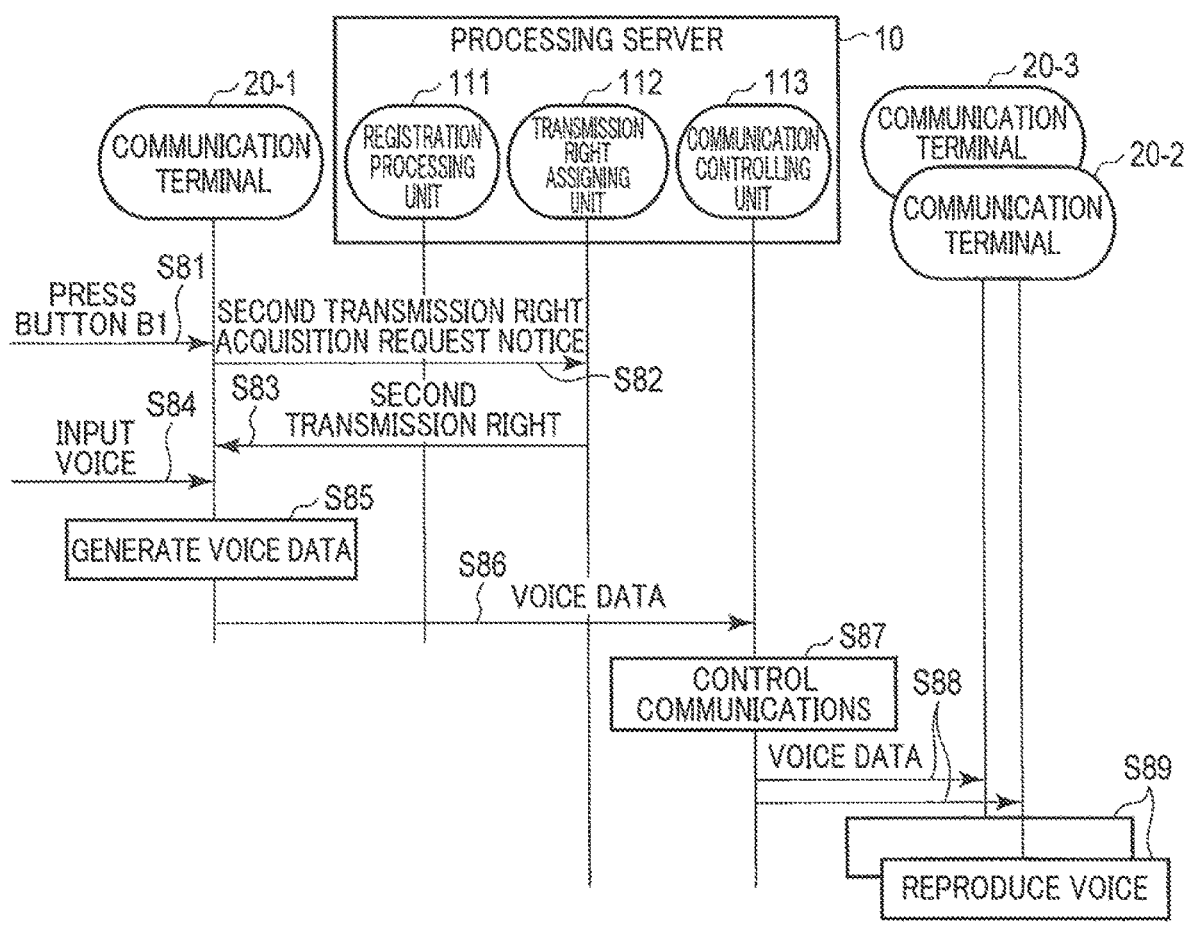
FIG. 8 is a diagram for explaining operations of the processing server and the communication terminals for performing voice communications in the communication system of FIG. 1.

FIG. 8 is a diagram for explaining exemplary operations of the processing server 10 and the communication terminals 20-1 to 20-3 for performing voice communications in the communication system 1 of FIG. 1.

In this instance, for example, the user of the communication terminal 20-1 presses the PTT call start requesting button B1 displayed on the display of the communication terminal 20-1 (step S81). Upon the user's pressing the button B1, the communication controlling unit 211 of the communication terminal 20-1 transmits a second transmission right acquisition request notice as a request for the transmission right for voice data, together with, for example, the user ID to the processing server 10 via the base station 30-1 and the network NW (step S82).

The transmission right assigning unit 112 of the processing server 10, upon receipt of the second transmission right acquisition request notice from the communication terminal 20-1, checks if none of the communication terminals in the same talk group are assigned with the second transmission right. Upon confirming that there is no communication terminal with the second transmission right in the same talk group, the transmission right assigning unit 112 assigns the second transmission right, i.e., the right to transmit data through a second channel, to the communication terminal 20-1 (step S83). At this time, the transmission right assigning unit 112 registers, for example, the talk group ID "Group01" of the talk group G1 to which the communication terminal 20-1 assigned with the second transmission right belongs, the user ID "User011" of the user of the communication terminal 20-1, and the channel ID "Channel02" of the second channel permitted for use under the second transmission right.

Upon acquisition of the second transmission right, the sound collection controlling unit 216 of the communication terminal 20-1 activates the microphone of the communication terminal 20-1. The user of the communication terminal 20-1 inputs voices from the microphone (step S84). The communication controlling unit 211 of the communication terminal 20-1 generates voice data based on the voices input from the microphone (step S85). The voice data has, for example, a packet structure that conforms to the TCP/IP-based unique protocol.

The voice data generated in step S85 includes, for example, an area for storing a talk group ID, an area for storing a caller ID, an area for storing a time stamp, an area for storing a data length, an area for storing main data, and so on. The communication controlling unit 211 of the communication terminal 20-1 stores the "Group01" in the area for storing a talk group ID, the "User01" in the area for storing a caller ID, the call start time in the area for storing a time stamp, digital data of as much as predetermined frames of voices in the area for storing main data, and the data length of the digital data of voices in the area for storing a data length. The call start time indicates the time at which the call began. More concretely, the communication controlling unit 211 sets, for example, the time at which the user pressed the PTT call start requesting button B1, as the call start time.

The communication terminal 20-1 transmits the generated voice data to the processing server 10 via the base station 30-1 and the network NW, using the second channel (step S86).

Upon receipt of the voice data from the communication terminal 20-1 with the second transmission right, the communication controlling unit 113 of the processing server 10 performs control for transferring the voice data to the communication terminals 20-2 and 20-3 participating in the talk group G1 (step S87). More specifically, and for example, upon receipt of the voice data from the communication terminal 20-1, the communication controlling unit 113 determines whether or not the caller ID "User01" stored in the voice data and the user ID "User01" of the user in possession of the second transmission right agree with each other. As the caller ID stored in the voice data and the user ID of the user in possession of the second transmission right are in agreement with each other, i.e., both being "User01", the communication controlling unit 113 generates duplicates of the voice data as many as the number of the users participating in the talk group G1. The communication controlling unit 113 transmits the duplicates of the voice data to the respective communication terminals 20-2 and 20-3 by referring to their IP addresses (step S88).

Upon receipt of the voice data from the processing server 10, the reproduction controlling unit 214 of each of the communication terminals 20-2 and 20-3 reproduces voices based on the received voice data and outputs them from the speaker (step S89).

The second transmission right is kept by the communication terminal 20-1 until it is released. As such, the communication terminal 20-1 can transmit the generated voice data until the second transmission right is released. The release of the second transmission right may be realized by, for example, the user of the communication terminal 20-1, currently with the second transmission right, removing its finger from the PTT call start requesting button B1. For example, the user continues pressing the button B1 from the start of its own comments, and when the end of the comments is decided, the user separates the finger from the button B1. In response to this, the communication terminal 20-1 transmits a second transmission right release request notice to the processing server 10. The transmission right assigning unit 112 of the processing server 10, upon receipt of the second transmission right release request notice, releases the second transmission right from the communication terminal 20-1. Note that the actions for acquiring and releasing the second transmission right are not limited to pressing and separating from the button B1.

When the user of the communication terminal 20-1 moves its finger away from the PTT call start requesting button B1, the sound collection controlling unit 216 of the communication terminal 20-1 deactivates the microphone. Upon deactivation of the microphone, the communication controlling unit 211 of the communication terminal 20-1 generates voice data based on the voices input from the microphone. The time stamp area in the generated voice data here stores, for example, the call start time and the call end time. The call end time is, for example, the time at which the finger of the user of the communication terminal 20-1 is separated from the PTT call start requesting button B1.

Figure 9:
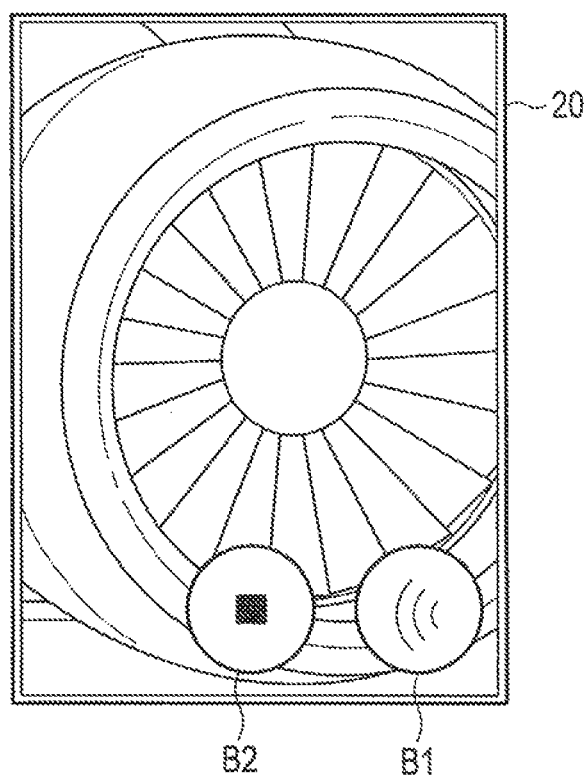
FIG. 9 is a schematic diagram showing what may be displayed on the display of the communication terminal of FIG. 3.

The processing shown in FIG. 4, from steps S47 to S415, may be performed in parallel with the processing shown in FIG. 8, from steps S81 to S89. That is, for example, each processing may proceed so that while the communication terminal 20-1 retains the first transmission right for image data, the second transmission right for voice data can be transferred to another terminal. This enables the communication terminals 20-1 to 20-3 to conduct mutual voice communications with images such as the one shown in FIG. 9 shared among the terminals.

(Processing for Storing Voice Data and Image Data)

Next, the processing in the processing server 10 for storing voice data and image data will be described in more detail.

Figure 10:
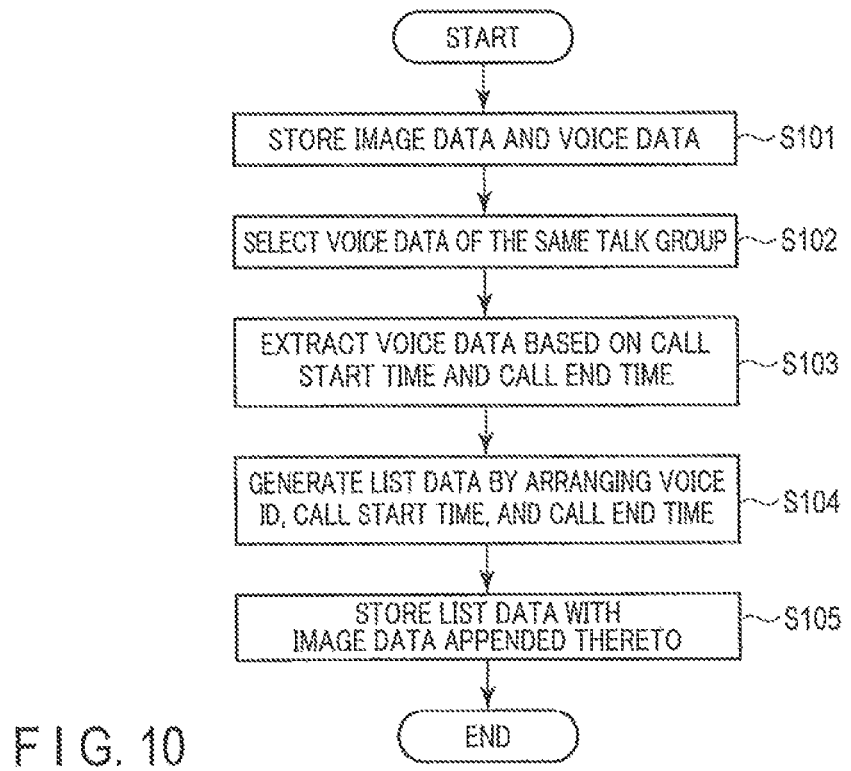
FIG. 10 is a flowchart showing operations of a storage controlling unit in the processor appearing in FIG. 2, for storing voice data and image data.

FIG. 10 is a flowchart showing exemplary operations of the storage controlling unit 114 in the processor 11 shown in FIG. 2, for storing voice data and image data.

The storage controlling unit 114 causes the storage 12 to store the image data transmitted from the communication terminal having the first transmission right, and the voice data transmitted from the communication terminal having the second transmission right (step S101).

More specifically, and for example, upon receipt of the image data from the communication terminal with the first transmission right, the storage controlling unit 114 retains the received image data in the memory. The storage controlling unit 114 decodes the image data retained in the memory when, for example, the first transmission right is released, that is, upon receipt of image data containing the imaging end time. The storage controlling unit 114 converts the image data after the decoding process into data of a predetermined format, and stores the data after the conversion in the storage 12. At this time, the storage controlling unit 114 appends, for example, a talk group ID, a time stamp containing the imaging start time and the imaging end time, and an image ID for image data identification, to the image data to be stored.

On this occasion, the storage controlling unit 114 may also generate a reduced-size image, e.g., a thumbnail image, based on the stored image data, and store it in the storage 12 together with the image data. Such a reduced-size image may be generated using, for example, any one representative frame contained in the image. As the representative frame, the leading frame may be selected, for example. Data of the reduced-size image, i.e., reduced-size image data, is stored in the storage 12 with, for example, a talk group ID and an image ID appended thereto.

Also, the storage controlling unit 114, upon receipt of the voice data from the communication terminal with the second transmission right, retains the received voice data in the memory. The storage controlling unit 114 decodes the voice data retained in the memory when, for example, the second transmission right is released, that is, upon receipt of voice data containing the call end time. The storage controlling unit 114 converts the voice data after the decoding process into data of a predetermined format, and stores the data after the conversion in the storage 12. At this time, the storage controlling unit 114 appends, for example, a talk group ID, a time stamp containing the call start time and the call end time, and a voice ID for voice data identification, to the voice data to be stored.

Subsequently, the storage controlling unit 114 generates list data for the image data, based on the image data and the voice data which have been stored in the storage 12. For example, the list data is generated for every image data, and serves as related data that shows each voice data transmitted during the transmission of individual image data. In the list data, for example, multiple voice data items transmitted in the middle of the image data transmission are shown in the form of a list.

More specifically, and for example, in response to the image data having been stored in the storage 12, the storage controlling unit 114 selects items of voice data, each labeled the same talk group ID as this stored image data, from the storage 12 (step S102). The storage controlling unit 114 extracts, from the selected voice data items, the voice data items indicating the call start time and the call end time both falling within the period from the imaging start time to the imaging end time of the image data (step S103).

The storage controlling unit 114 may generate the list data by orderly arranging the voice ID, the call start time, and the call end time of each of the extracted voice data items (step S104). The storage controlling unit 114 appends, for example, the corresponding image ID to the generated list data, and stores the list data in the storage 12 (step S105). The processing is then terminated.

Figure 11:
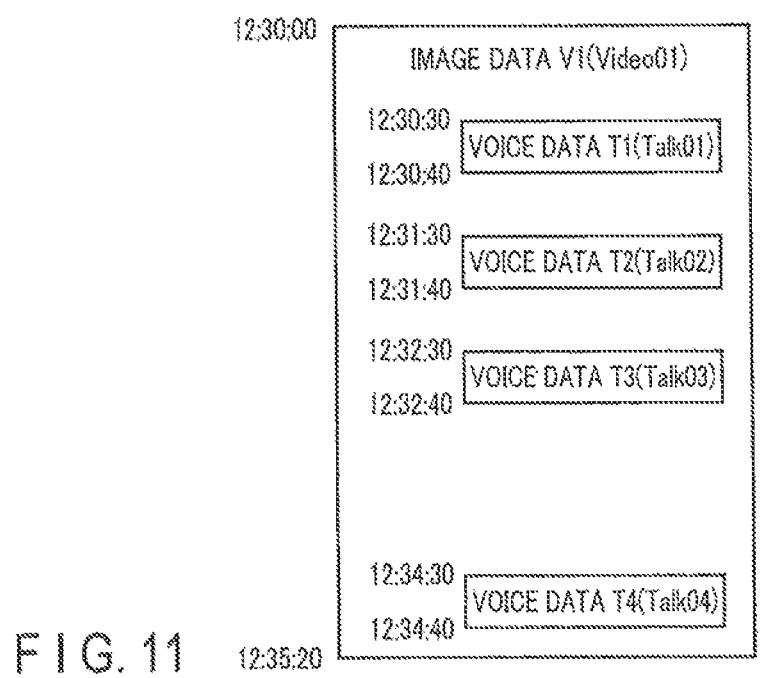
FIG. 11 is a conceptual diagram showing an example of list data generated for image data.

FIG. 11 is a conceptual diagram showing an example of the list data generated for image data V1. The list data of FIG. 11 is the one generated for the image data V1 labeled the talk group ID "Group01", the image ID "Video01", the imaging start time "12:30:00" (h:m:s), and the imaging end time "12:35:20" (h:m:s). To generate the list data for the image data V1, the storage controlling unit 114 extracts items of voice data, i.e., voice data T1 to voice data T4, each indicating the talk group ID "Group01" and also being a call made within the period from the time 12:30:00 (h:m:s) to the time 12:35:20 (h:m:s).

The storage controlling unit 114 then generates, based on the extracted voice data T1 to voice data T4, the list data including, for example, the call start time "12:30:30" (h:m:s), the call end time "12:30:40" (h:m:s), the voice ID "Talk01", the call start time "12:31:30" (h:m:s), the call end time "12:31:40" (h:m:s), the voice ID "Talk02", the call start time "12:32:30" (h:m:s), the call end time "12:32:40" (h:m:s), the voice ID "Talk03", and the call start time "12:34:30" (h:m:s), the call end time "12:34:40" (h:m:s), the voice ID "Talk04". The storage controlling unit 114 appends the image ID "Video01" of the image data to the generated list data, and stores the list data in the storage 12.

(Checking Image Data History)

Next, the processing in the communication terminals 20 for checking the history of image data will be described in detail.

Figure 12:
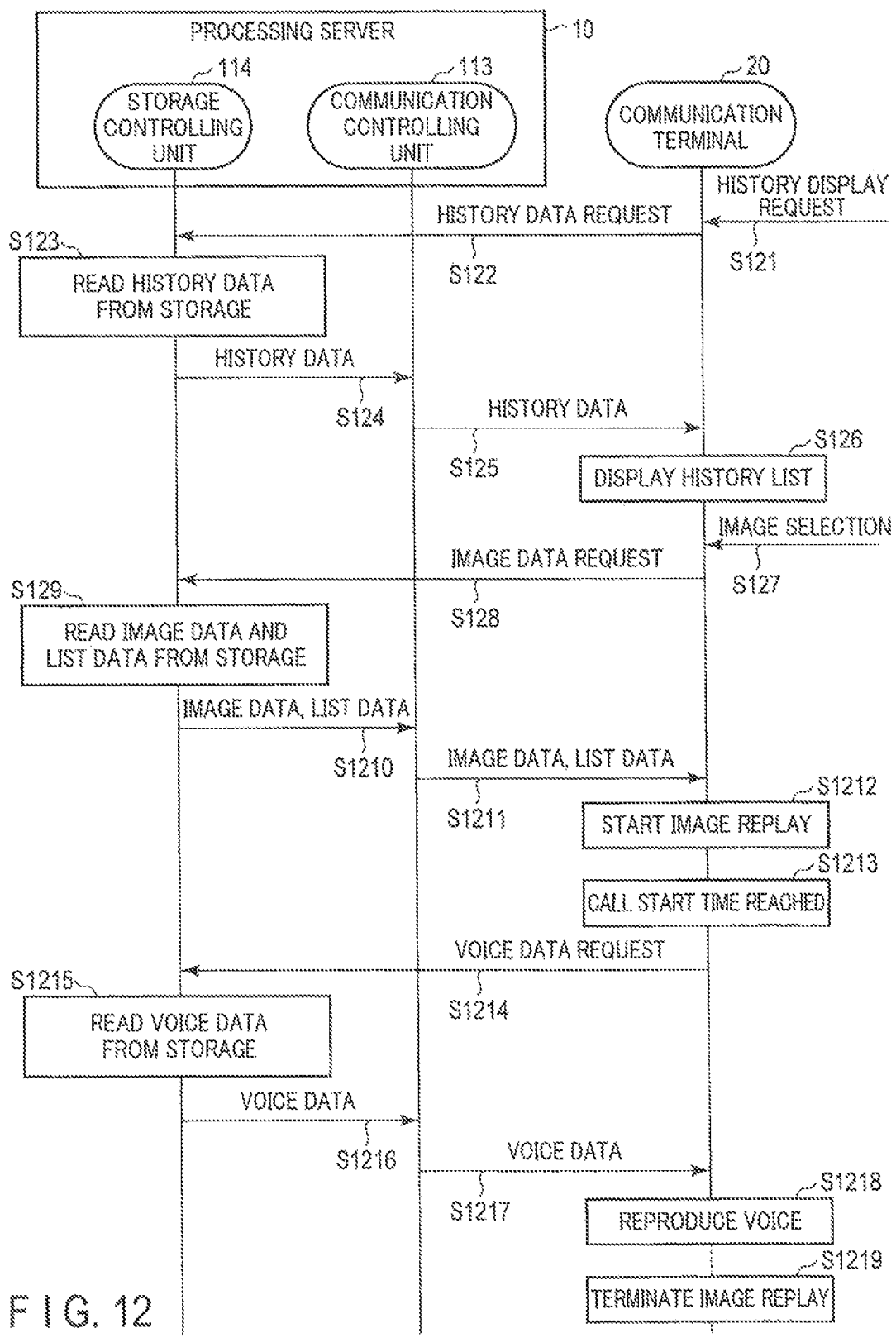
FIG. 12 is a diagram for explaining operations of the processing server and the communication terminals as shown in FIGS. 1 and 3, for the communication terminals to check past image data.

FIG. 12 is a diagram for explaining exemplary operations of the processing server 10 and one of the communication terminals 20 as shown in FIGS. 1 and 3, for this communication terminal 20 to check past images. The explanation based on FIG. 12 assumes that the user of the communication terminal 20 may be participating in the talk group G1.

In FIG. 12, the user of the communication terminal 20, who desires to check a past image, inputs a request for display of a history list through the input interface 23 (step S121). For example, the user may tap the region on the display, where an indication "History List" is displayed.

In response to the input of this history list display request from the user, the communication controlling unit 211 of the communication terminal 20 transmits a display request notice indicative of the request for display of a history list for the talk group (talk group ID "GroupXX"), to which the communication terminal 20 belongs, to the processing server 10 via the base station 30 and the network NW (step S122). The display request notice here is labeled a user ID "UserXX" of the user of the requestor communication terminal 20, and the talk group ID "GroupXX" of the talk group to which the communication terminal belongs.

Upon receipt of the display request notice, the storage controlling unit 114 of the processing server 10 reads the reduced-size image data containing the talk group ID "GroupXX" from the storage 12 (step S123).

The communication controlling unit 113 of the processing server 10 sequentially converts the reduced-size image data read from the storage 12 into packet-form data (step S124). The communication controlling unit 113 transmits the reduced-size image data having been converted into packets, to the IP address specified based on the user ID appended to the display request notice (step S125).

In response to receiving the reduced-size image data from the processing server 10, the storage controlling unit 212 of the communication terminal 20 sequentially stores the received reduced-size image data in the RAM. The display controlling unit 213 of the communication terminal 20 reads the stored reduced-size image data from the RAM, and displays the reduced-size image based on the read reduced-size image data on the screen of the display, where the talk group ("GroupXX") is associated (step S126). In this instance, when the communication terminal 20 receives reduced-size image data for multiple reduced-size images, the display may be caused to display the multiple reduced-size images in the form of a list or a catalog.

The user of the communication terminal 20 views the reduced-size images presented on the display, and determines whether or not an image desired for replay is included. If the image desired for replay is found, the user inputs a request for replay of the image through the input interface 23, by selecting the corresponding one of the displayed reduced-size images (step S127).

Upon input of the image replay request from the user, the communication controlling unit 211 of the communication terminal 20 transmits a replay request notice indicative of the request for replay of image data, for example, the image data V1 indicating the image ID "Video01" as appended to the selected reduced-size image, to the processing server 10 via the base station 30 and the network NW (step S128). The replay request notice here is labeled the user ID "UserXX"

of the user of the requestor communication terminal 20, and the image ID "Video01" of the image data V1 for which a replay is requested.

Upon receipt of the replay request notice, the storage controlling unit 114 of the processing server 10 reads the image data V1 and the list data containing the image ID "Video01" from the storage 12 (step S129).

The communication controlling unit 113 of the processing server 10 sequentially converts the image data V1 and the list data read from the storage 12 into packet-form data (step S1210). The communication controlling unit 113 transmits the image data and the list data, having been converted into packets, to the IP address specified based on the user ID appended to the replay request notice (step S1211). At this time, the communication controlling unit 113 may transmit the list data to the communication terminal 20, prior to the image data.

In response to receiving the list data from the processing server 10, the storage controlling unit 212 of the communication terminal 20 stores the received list data in the RAM. Accordingly, items of the voice data, which are correlated with the replay-expected image data, can be comprehended.

Also, in response to receiving the image data from the processing server 10, the storage controlling unit 212 sequentially stores the received image data in the RAM. The display controlling unit 213 of the communication terminal 20 reads the stored image data from the RAM, and displays the image based on the read image data on the display (step S1212). When the streaming replay of the image proceeds, and the time count in the image data reaches a given call start time managed with the list data, for example, the time "12:30:30" (h:m:s) as shown in FIG. 11. (step S1213), the communication controlling unit 211 of the communication terminal 20 transmits a replay request notice indicative of the request for replay of corresponding voice data, i.e., the voice data T1, to the processing server 10 via the base station 30 and the network NW (step S1214). The replay request notice here is labeled the user ID "UserXX" of the user of the requestor communication terminal 20, and the voice ID "Talk01" of the voice data T1 for which a replay is requested.

Note that the display controlling unit 213 may execute the replay of images at a normal rate, or at a rate higher than or lower than the normal rate. Also, the display controlling unit 213 may execute the replay of images so that the replay skips over image frames to the call start time for given voice data, in accordance with a skip replay instruction input from the input interface 23. This allows for an instant progression of the image up to the point of a given comment, and therefore, the history can be efficiently checked.

Upon receipt of the replay request notice, the storage controlling unit 114 of the processing server 10 reads the voice data T1 containing the voice ID "Talk01" from the storage 12 (step S1215).

The communication controlling unit 113 of the processing server 10 sequentially converts the voice data T1 read from the storage 12 into packet-form data (step S1216). The communication controlling unit 113 transmits the voice data having been converted into packets, to the IP address specified based on the user ID appended to the replay request notice (step S1217).

In response to receiving the voice data from the processing server 10, the storage controlling unit 212 sequentially stores the received voice data in the RAM. The reproduction controlling unit 214 of the communication terminal 20 reads the stored voice data from the RAM, and reproduces the voice based on the read voice data from the speaker (step S1218). When the streaming replay of the image proceeds, and the time count in the image data reaches the next call start time managed with the list data, for example, the time "12:31:30" (h:m:s) as shown in FIG. 11, the communication controlling unit 211 of the communication terminal 20 transmits a replay request notice indicative of the request for replay of corresponding voice data, i.e., the voice data T2, to the processing server 10 via the base station 30 and the network NW.

The processing server 10 and the communication terminal 20 repeat the processing from step S1213 to step S1218 until the replay of the image based on the image data comes to the end. Upon completing the replay of the image data stored in the RAM, the communication terminal 20 terminates the image replay operation (step S1219).

If, in the middle of the communication terminal 20 performing past image and voice viewing, another communication terminal 20 with the first transmission right transmits new image data, the user of the communication terminal 20 is enabled to select whether to replay the new image data or not.

More specifically, an exemplary case will be supposed, where during the ongoing transmission of past image data to the communication terminal 20, the communication controlling unit 113 of the processing server 10 receives image data newly transmitted from another one of the communication terminals 20 that possesses the first transmission right. In this case, the communication controlling unit 113 sends an inquiry to the communication terminal 20 currently performing the past image and voice viewing, as to whether or not to replay the new image data.

The display controlling unit 213 of the applicable communication terminal 20 causes its display to display the inquiry from the processing server 10. If the user of this communication terminal 20 selects the replay, the communication controlling unit 211 transmits a replay request notice for the new image data to the processing server 10. If, on the other hand, the user of the communication terminal 20 does not select the replay, the processing server 10 maintains the transmission of the past image data to the communication terminal 20. Upon receipt of the replay request notice for the new image data, the communication controlling unit 211 of the processing server 10 halts the transmission of the past image data and starts transmission of the new image data.

According to the embodiments as in the foregoing disclosure, the transmission right assigning unit 112 of the processing server 10 is adapted to assign the first transmission right, i.e., the right to transmit image data, to one of the communication terminals belonging to the same talk group, e.g., the communication terminals 20-1 to 20-3 belonging to the talk group G1, and to assign the second transmission right, i.e., the right to transmit voice data, to any one of these communication terminals. The communication controlling unit 211 is adapted to transmit, through the first channel, the image data transmitted from the communication terminal with the first transmission right to the communication terminals other than the communication terminal with the first transmission right. The communication controlling unit 211 is also adapted to transmit, through the second channel, the voice data transmitted from the communication terminal with the second transmission right to the communication terminals other than the communication terminal with the second transmission right.

In actual scenes where situation reports are exchanged under the PoC, not only voices but also images are desired to be shared among multiple communication terminals. The currently available PoC framework permits transmission of video taken by a communication terminal having acquired a transmission right to other communication terminals in a multicast manner. However, in order to permit another communication terminal to submit an opinion, etc. about the transmitted video, the transmission right for data must be transferred to this another communication terminal. That is, the multicast transmission of the video needs to be temporarily stopped. As such, poor usability is expected for conducting opinion exchanges among the multiple communication terminals while sharing images.

In the configuration according to the embodiments, image data transmitted from the communication terminal assigned with the first transmission right is transmitted to the other communication terminals through the first channel, and voice data transmitted from the communication terminal assigned with the second transmission right is transmitted to the other communication terminals through the second channel. Therefore, the users of the communication terminals 20-1 to 20-m, participating in the talk group, can mutually transmit their voice data while sharing an image among the communication terminals 20-1 to 20-m.

Consequently, the communication system 1 and the processing server 10, following the embodiments, can realize smooth information exchanges involving images in the one-to-many simultaneous group data communications.

According to the embodiments, also, the storage controlling unit 114 of the processing server 10 is adapted to store the image data and the voice data, transmitted from the communication terminals 20, in the storage 12. The storage controlling unit 114 is adapted to generate, based on the image data and the voice data stored in the storage 12, the list data in which items of the voice data having been transmitted in the middle of the transmission of the image data are listed, and stores this list data in the storage 12. This configuration allows for easy comprehension of the voice data that should be reproduced in conjunction with the replay of the image data.

According to the embodiments, the storage controlling unit 212 of the communication terminal 20 is not adapted to store image data or voice data in the own storage 22. When the user of the communication terminal 20 is in need of checking a past image, the communication controlling unit 211 of the communication terminal 20 is adapted to request the processing server 10 for the corresponding past image data and voice data. Thus, as the communication terminals 20 do not keep image data or voice data in their storages, information leakage can be prevented.

Also in the configuration according to the embodiments, the communication terminal 20, for checking past image data and voice data, receives the past image data as well as the list data for this image data from the processing server 10. The communication controlling unit 211 of the communication terminal 20 is adapted to refer to this list data and request the voice data related to the image data from the processing server 10. Therefore, the replay of the past image, together with the reproduction of the voices related to this image, can be done.

Moreover, in the configuration according to the embodiments, if, during the communication terminal 20 performing past image and voice viewing, new image data is transmitted from another communication terminal 20 that possesses the first transmission right, the communication controlling unit 113 of the processing server 10 inquires of the communication terminal 20 performing the past image and voice viewing, whether or not to replay the new image data. This configuration can prevent the newly transmitted image data from being inadvertently missed while the communication terminal 20 is performing past image and voice viewing.

Note that the foregoing embodiments have assumed the exemplary instances where the processing server 10 transmits reduced-size image data to the communication terminal 20 in response to the request for display of a history list from the communication terminal 20. The embodiments are not limited to such instances. The processing server 10 may be adapted to enable the communication terminal 20 to display, for example, a list of imaging start times in accordance with the request for display of a history list. More specifically, upon receipt of the request for display of a history list from the communication terminal 20, the processing server 10 may read, for example, time stamps and image IDs appended to items of the image data. The processing server 10 then transmits the read data to the communication terminal 20. The communication terminal 20 displays the list of imaging start times from among the received data.

The user of the communication terminal 20 selects the imaging start time for the image desired for replay, from the imaging start times presented on the display. The communication terminal 20 accordingly transmits the replay request notice for requesting the replay of the image data associated with the selected imaging start time to the processing server 10.

Also note that the foregoing embodiments have been described assuming the exemplary instances where the image data does not contain voice data. However, this is not a limitation, either. The communication terminal 20 may be adapted to switch the conversion processing in response to an instruction from the user so that the image data will contain voice data. In this operation, the communication controlling unit 211 of the communication terminal 20 may convert the image data generated by the imager 27 and the voice data input from the microphone, in compliance with a predetermined communication protocol, e.g., RTMP, or a unique protocol. The communication controlling unit 211 transmits the data after the conversion to the processing server 10 via the network and the base station 30 using, for example, the first channel. Thus, the embodiments can cope with the instances where images and voices are simultaneously transmitted.

Furthermore, while the foregoing embodiments have been described assuming the exemplary instances where the processing server 10 transmits voice data and image data to the communication terminals, e.g., the communication terminals 20-1 to 20-3, the types of data transmitted from the processing server 10 to these communication terminals are not limited. In other exemplary instances, text data may be transmitted from the processing server 10 to the communication terminals 20-1 to 20-3.

In such instances, the processor 11 of the processing server 10 may have, for example, a function to serve as a texting processing unit. The texting processing unit is adapted to convert the voice data transmitted from the communication terminal with the second transmission right into text data. More specifically, and for example, the texting processing unit converts a predetermined volume of the voice data retained in the memory into text data based on grammar information, linguistic structure information, information about compositions of voice data, stored word information, and so on. Note that the voice-to-text conversion processing adopted by the texting processing unit may utilize the existing technology.

The text data may be transmitted to the communication terminals 20-1 to 20-3 together with the corresponding voice data. The text data may be transmitted to the communication terminals 20-1 to 20-3, after transmitting the corresponding voice data. Also, the text data may be transmitted to one or more of the communication terminals 20-1 to 20-3, which have responded to a notice of completion of converting the voice data into texts.

Figure 13:
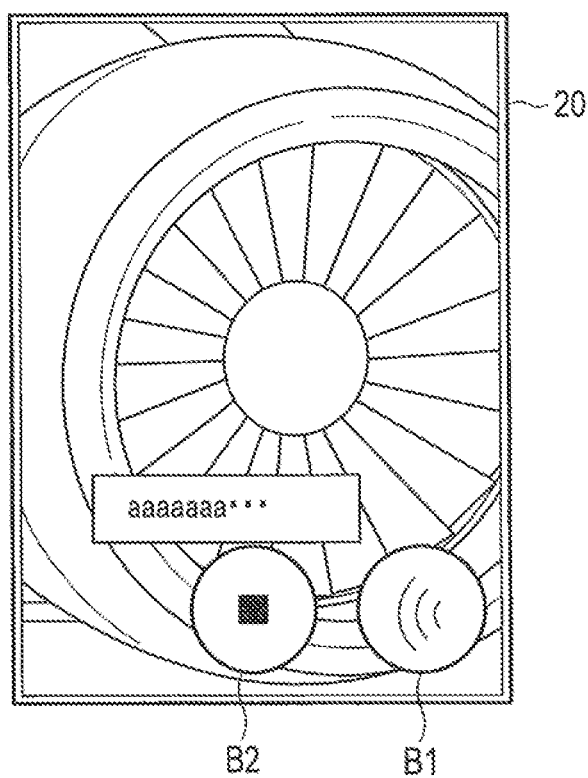
FIG. 13 is a schematic diagram showing what may be displayed on the display of the communication terminal of FIG. 3.

In each of the communication terminals 20-1 and 20-3, the display controlling unit 213 causes the display to display the characters based on the received text data. At this time, the display controlling unit 213 may display the characters obtained based on the text data at a position on the display so that the characters would not interfere with the displayed image as much as possible. For example, as shown in FIG. 13, the characters based on the text data may be given in the lower portion of the display and above the PTT call start requesting button B1 and the PTT streaming start requesting button B2. Also, the presentation of the characters may be fixed with respect to the display, or may be slidably moved in lateral directions, etc.

Moreover, the object transmitted from the processing server 10 to the communication terminals 20-1 to 20-3 may be, for example, translated text data. In such an instance, the processor 11 of the processing server 10 may have, for example, a function to serve as a translation processing unit. The translation processing unit is adapted to perform translation processing on the text data obtained by the texting processing unit's conversion process, in order to generate the translated text data. More specifically, and for example, the translation processing unit translates the text data obtained by the texting processing unit's conversion process into the text data of a language corresponding to a language code associated with the target user participating in the talk group. Note that the translation processing adopted by the translation processing unit may utilize the existing technology, including the statistical machine translation, neural machine translation, etc.

The translated text data may be transmitted to the communication terminals 20-1 to 20-3 together with the corresponding text data. The translated text data may be transmitted to the communication terminals 20-1 to 20-3, after transmitting the corresponding text data. The translated text data may be transmitted to the communication terminals 20-1 to 20-3, after transmitting the corresponding voice data, as well. Further, the translated text data may be transmitted to one or more of the communication terminals 20-1 to 20-3, which have responded to a notice of completion of translating the text data.

In each of the communication terminals 20-1 and 20-3, the display controlling unit 213 causes the display to display the characters based on the received translated text data. At this time, the display controlling unit 213 may display the characters obtained based on the translated text data at a position on the display so that the characters would not interfere with the displayed image as much as possible. For example, as shown in FIG. 13, the characters based on the translated text data may be given in the lower portion of the display and above the PTT call start requesting button B1 and the PTT streaming start requesting button B2.

The invention in this disclosure is not limited to the foregoing embodiments as they are. For practical implementation, the invention may be embodied while involving modifications to its constitution without departing from the gist of the invention. Furthermore, various inventions may be formed from appropriate combinations of the components disclosed in the embodiments. For example, one or more components may be omitted from the entire constitution illustrated through the embodiments.

What is claimed is:

1. A signal, processing apparatus comprising:
   processing circuitry configured to:
   correlate a plurality of communication terminals as a group, and assign a first transmission right to a primary terminal in the group and a second transmission right to the primary terminal in the group, the first transmission right being a right to transmit image data, the second transmission right being a right to transmit voice data; and
   transmit, through a first channel, image data transmitted from the primary terminal which is assigned with the first transmission right to remaining one or more of the communication terminals in the group, and transmit, through a second channel that is different from the first channel, voice data transmitted from the primary terminal which is assigned with the second transmission right to remaining one or more of the communication terminals in the group,
   wherein the processing circuitry is configured to permit the primary terminal to be assigned with both the first transmission right and the second transmission right;
   wherein the voice data and the image data is stored on a process server and not the plurality of communication terminals;
   wherein the voice data and the image data is transmitted from the process server to one or more of the plurality of terminals that is authorized for replay or viewing; and
   wherein the first transmission right and the second transmission right are assignable to terminals different from each other.

2. The signal processing apparatus according to claim 1, wherein the processing circuitry is configured to store the image data transmitted from the primary terminal which is assigned with the first transmission right and the voice data transmitted from the primary terminal which is assigned with the second transmission right, and generate, based on the stored image data and the stored voice data, related data indicative of the voice data transmitted during transmission of the image data.

3. The signal processing apparatus according to claim 2, wherein the processing circuitry is configured to transmit, in response to a request for replay of image data from a requestor terminal of the group of the plurality of communication terminals, the image data requested for replay and the related data for the image data requested for replay to the requestor terminal.

4. The signal processing apparatus according to claim 3, wherein the processing circuitry is configured to transmit, in response to a request for replay of voice data indicated by the related data from the requestor terminal, the voice data requested for replay to the requestor terminal.

5. The signal processing apparatus according to claim 3, wherein the processing circuitry is configured to send, in response to receiving new image data transmitted from the primary terminal during transmission of the image data requested for replay to the requestor terminal, an inquiry to the requestor terminal as to whether or not to replay the new image data.

6. The signal processing apparatus according to claim 1, wherein the processing circuitry is configured to generate text data based on the voice data transmitted from the primary terminal which is assigned with the second transmission right, and transmit the generated text data to at least one of the communication terminals in the group.

7. The signal processing apparatus according to claim 6, wherein the processing circuitry is configured to translate the generated text data, and transmit the translated text data to at least one of the communication terminals in the group.

8. A signal processing apparatus comprising:
processing circuitry configured to:
correlate a plurality of communication terminals as a group, and assign a first transmission right to a primary terminal in the group and a second transmission right to a primary terminal in the group, the first transmission right being a right to transmit image data, the second transmission right being a right to transmit voice data; and
transmit, through a first channel, image data transmitted from the primary terminal which is assigned with the first transmission right to remaining one or more of the communication terminals in the group, and transmit, through a second channel that is different from the first channel, voice data transmitted from the primary terminal which is assigned with the second transmission right to remaining one or more of the communication terminals in the group; and
store on a process server the image data transmitted from the primary terminal which is assigned with the first transmission right and the voice data transmitted from the primary terminal which is assigned with the second transmission right, and generate, based on the stored image data and the stored voice data, related data indicative of the voice data transmitted during transmission of the image data;
wherein the voice data and the image data is stored on the process server and not the plurality of communication terminals;
wherein the voice data and the image data is transmitted from the process server to one or more of the plurality of terminals that is authorized for replay or viewing; and
wherein the first transmission right and the second transmission right are assignable to terminals different from each other.

9. The signal processing apparatus according to claim 8, wherein the processing circuitry is configured to transmit, in response to a request for replay of image data from a requestor terminal of the group of the plurality of communication terminals, the image data requested for replay and the related data for the image data requested for replay to the requestor terminal.

10. The signal processing apparatus according to claim 9, wherein the processing circuitry is configured to transmit, in response to a request for replay of voice data indicated by the related data from the requestor terminal, the voice data requested for replay to the requestor terminal.

11. The signal processing apparatus according to claim 9, wherein the processing circuitry is configured to send, in response to receiving new image data transmitted from the primary terminal during transmission of the image data requested for replay to the requestor terminal, an inquiry to the requestor terminal as to whether or not to replay the new image data.

12. The signal processing apparatus according to claim 8, wherein the processing circuitry is configured to generate text data based on the voice data transmitted from the primary terminal which is assigned with the second transmission right, and transmit the generated text data to at least one of the communication terminals in the group.

13. The signal processing apparatus according to claim 12, wherein the processing circuitry is configured to translate the generated text data, and transmit the translated text data to at least one of the communication terminals in the group.

14. A communication method comprising:
correlating a plurality of communication terminals as a group;
assigning a first transmission right to a primary terminal in the group, the first transmission right being a right to transmit image data;
transmitting, through a first channel, image data transmitted from the primary terminal which is assigned with the first transmission right to remaining one or more of the communication terminals in the group;
assigning a second transmission right to the primary terminal in the group, the second transmission right being a right to transmit voice data, wherein the assigning assigns the primary terminal both the first transmission right and the second transmission right; and
transmitting, through a second channel that is different from the first channel, voice data transmitted from the primary terminal which is assigned with the second transmission right to remaining one or more of the communication terminals in the group;
wherein the first transmission right and the second transmission right are assignable to terminals different from each other.

15. A non-transitory computer readable storage medium storing a program to cause a processor to perform processing comprising:
correlating a plurality of communication terminals as a group;
assigning a first transmission right to a primary terminal in the group, the first transmission right being a right to transmit image data;
transmitting, through a first channel, image data transmitted from the primary terminal which is assigned with the first transmission right to remaining one or more of the communication terminals in the group;
assigning a second transmission right to the primary terminal in the group, the second transmission right being a right to transmit voice data, wherein the assigning assigns the primary terminal both the first transmission right and the second transmission right; and
transmitting, through a second channel that is different from the first channel, voice data transmitted from the primary terminal which is assigned with the second transmission right to remaining one or more of the communication terminals in the group; and
wherein the first transmission right and the second transmission right are assignable to terminals different from each other.

16. A communication system comprising:
a plurality of communication terminals; and
a signal processing apparatus,
wherein the signal processing apparatus comprises processing circuitry configured to:
correlate the communication terminals as a group, and assign a first transmission right to a primary terminal in the group and a second transmission right to the primary terminal in the group, the first transmission right being a right to transmit image data, the second transmission right being a right to transmit voice data, and
transmit, through a first channel, image data transmitted from the primary terminal which is assigned with the first transmission right to remaining one or more of the communication terminals in the group, and transmit, through a second channel that is different from the first channel, voice data transmitted from the primary terminal which is assigned with the second transmission right to remaining one or more of the communication terminals in the group, wherein the processing circuitry is configured to permit the primary terminal to be assigned with both the first transmission right and the second transmission right; and wherein the first transmission right and the second transmission right are assignable to terminals different from each other.

\* \* \* \* \*